US007386045B2

United States Patent
Bar-Ness et al.

(10) Patent No.: US 7,386,045 B2
(45) Date of Patent: Jun. 10, 2008

(54) DYNAMIC DIFFERENTIATED LINK ADAPTATION FOR ULTRA-WIDEBAND COMMUNICATION SYSTEM

(75) Inventors: Yeheskel Bar-Ness, Marlboro, NJ (US); Jordi Diaz, Weehawken, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 11/075,254

(22) Filed: Mar. 8, 2005

(65) Prior Publication Data
US 2005/0201446 A1  Sep. 15, 2005

Related U.S. Application Data

(60) Provisional application No. 60/551,397, filed on Mar. 9, 2004.

(51) Int. Cl.
*H03K 7/08* (2006.01)
*H03K 7/04* (2006.01)
(52) U.S. Cl. ........................... 375/238; 375/239
(58) Field of Classification Search ............... 375/238, 375/239
See application file for complete search history.

(56) References Cited

U.S. PATENT DOCUMENTS

| | | | |
|---|---|---|---|
| 5,677,927 A | 10/1997 | Fullerton et al. | |
| 6,571,089 B1 * | 5/2003 | Richards et al. | 455/266 |
| 6,671,310 B1 | 12/2003 | Richards et al. | |
| 6,717,992 B2 | 4/2004 | Cowie et al. | |
| 7,031,742 B2 * | 4/2006 | Chen et al. | 455/522 |
| 2003/0202563 A1 * | 10/2003 | Das et al. | 375/146 |
| 2004/0258133 A1 | 12/2004 | Lee et al. | |

OTHER PUBLICATIONS

Andreas F. Molisch et al., A Low-Cost Time-Hopping Impulse Radio System for High Data Rate Transmission:, Mitsubishi Electric Research Laboratores, Technical Report TR2003-129, published Oct. 2003.
V. Srinivasa Somayazulu, "Multiple Access Performance in UWB Systems Using Time Hoping vs. Direct Sequence Spreading", IEEE Wireless Communications and Networking Conference, WCNC 2002 Conference Proceedings, Paper 15-7, Mar. 20, 2002.

(Continued)

*Primary Examiner*—Kevin Kim
(74) *Attorney, Agent, or Firm*—Connolly Bove Lodge & Hutz LLP

(57) ABSTRACT

Optimum usage of time diversity and significantly higher data rates are achieved by utilizing an adaptive Ultra-wideband impulse radio (UWB IR) transmission scheme based upon information about the channel state at a particular time instant. Through the use of channel state information, the transmission scheme is adjusted for the particular channel state. In particular, the system is adapted dynamically for each user by varying the number of pulses transmitted per bit in response to the channel state. The channel state is a dynamic parameter of the transmission system that is typically measured or estimated by the receiver. An adaptation element responds to the channel state information to determine a desired number of pulses per bit to be utilized in a transmission channel for subsequent UWB IR communication. This desired number of pulses per bit is then supplied to and used by an adaptive transmitter for subsequent transmission by a particular mobile station.

52 Claims, 10 Drawing Sheets

OTHER PUBLICATIONS

M. Z. Win and R. A. Scholtz, "Ultra-Wide Bandwidth Time-Hopping Spread-Spectrum Impulse Radio for Wireless Multiple-Access Communications", IEEE Transactions on Communications, vol. 48, No. 4, Apr. 2000, pp. 679-691.

M. Z. Win and R. A. Scholtz, "Impulse Radio: How It Works", IEEE Communications Letters, vol. 2, No. 2, Feb. 1998, pp. 36-38.

R. A. Scholtz and M. Z. Win, "Impulse Radio", Invited Paper, IEEE PIMRC'97, Helsinki, Finland.

R. A. Scholtz, "Multiple Access With Time-Hopping Impulse Modulation", Proc. of IEEE Milcom, vol. 2, Oct. 1993, pp. 447-450.

J. A. C. Bingham, "Multicarrier Modulation for Data Transmission: An Idea Whose Time Has Come", IEEE Communications Magazine, May 1990., pp. 5-14.

S. Nanda et al., "Adaptation Techniques in Wireless Packet Data Services", IEEE Communications Magazine, Jan. 2000, pp. 54-64.

B. Vucetic, "An Adaptive Coding Scheme for Time-Varying Channels", IEEE Transactions on Communications, vol. 39, No. 5, May 1991, pp. 653-663.

L. C. Yun and D. G. Messerschmitt, "Variable Quality of Service in CDMA Systems by Statistical Power Control", 1995 IEEE, pp. 713-719.

J. F. Hayes, "Adaptive Feedback Communications", IEEE Transactions on Communication Technology, vol. Com-16, No. 1, Feb. 1968, pp. 29-34.

M. Filip and E. Vilar, "Optimum Utilization of the Channel Capacity of a Satellite Link in the Presence of Amplitude Scintillations and Rain Attenuation", IEEE Transactions on Communications, vol. 38, No. 11, Nov. 1990, pp. 1958-1965.

J. K. Cavers, "Variable-Rate Transmission for Rayleigh Fading Channels", IEEE Transactions on Communications, vol. Com-20, No. 1, Feb. 1972, pp. 15-22.

* cited by examiner

DYNAMIC DIFFERENTIATED LINK ADAPTATION FOR ULTRA-WIDEBAND COMMUNICATION SYSTEM

CROSS-REFERENCE TO RELATED APPLICATIONS

This application claims the benefit of priority from U.S. Provisional Patent Application Ser. No. 60/551,397 filed on Mar. 9, 2004. The above provisional patent application is incorporated by reference herein in its entirety.

BACKGROUND OF THE INVENTION

1. Field of the Invention

This invention relates to a method and apparatus for wireless communications and, more particularly, to adaptive transmission in ultra-wideband communication systems.

2. Description of the Related Art

Ultra-Wideband (UWB) communication systems generally involve wireless transmission having a 3 dB bandwidth occupying more than 25% of its center frequency, or more than 1.5 GHz. An Ultra-Wideband Impulse Radio (IR) system communicates using baseband pulses of very short duration—typically on the order of a nanosecond—thereby spreading the energy of the radio signal very thinly over a broad bandwidth. Energy spreading of about a few W per MHz occurs in these systems from the low end of the band near DC to the top end of the band located around a few Gigahertz. For example, see R. A. Scholtz, "*Multiple Access with Time-Hopping Impulse Modulation*," Proc. Of IEEE Milcom., Vol. 2, pp. 447-450 (October 1993).

UWB IR communications promises to be a viable technique for building relatively simple, low-cost, low-power transceivers that can be used for short range, high speed, multiple-access, multimedia communications over the multi-path indoor wireless channel. Proponents of UWB communications claim that UWB is intended to reutilize spectrum by taking advantage of light usage of frequency bands assigned to other services. This wideband communication technology is designed to coexist with many other narrow-band signals that simultaneously occupy portions of this extremely large transmission bandwidth without causing intolerable interference problems.

It is important in such a wideband technology that the channel capacity be used efficiently and effectively. But it can be shown that, when the system parameters are designed, optimized, and implemented, the system performance as a measure of channel capacity utilization varies as the channel conditions vary. In the fading wireless environment, channel capacity in a UWB IR system is used relatively efficiently under poor channel conditions and relatively poorly when fading abates.

Conventional multiple access employing time hopping sequences for UWB communications involving IR modulation uses time diversity to achieve a desired bit-error-rate consistent with regulatory restrictions on power spectral density. Unfortunately, the use of time diversity reduces the maximum data rate achievable for the system.

SUMMARY OF THE INVENTION

Optimum usage of time diversity and significantly higher data rates are achieved in accordance with the principles of the present invention by utilizing an adaptive UWB IR transmission scheme based upon information about the channel state at a particular time instant. Through the use of channel state information, the transmission scheme is adjusted for the particular channel state.

In particular, the system is adapted dynamically for each user by varying the number of pulses transmitted per bit in response to the channel state. The channel state is a dynamic parameter of the transmission system that is typically measured or estimated by the receiver. An adaptation element responds to the channel state information to determine a desired number of pulses per bit to be utilized in a transmission channel for subsequent UWB IR communication. This desired number of pulses per bit is then supplied to and used by an adaptive transmitter for subsequent transmission by a particular mobile station.

Adaptive transmission for UWB communications in accordance with the principles of the present invention exceeds conventional, non-adaptive UWB systems in terms of overall channel and system throughput while maintaining a low level of system complexity.

BRIEF DESCRIPTION OF THE DRAWINGS

A more complete understanding of the invention may be obtained by reading the following description of specific illustrative embodiments of the invention in conjunction with the appended drawings in which.

Figure 1:
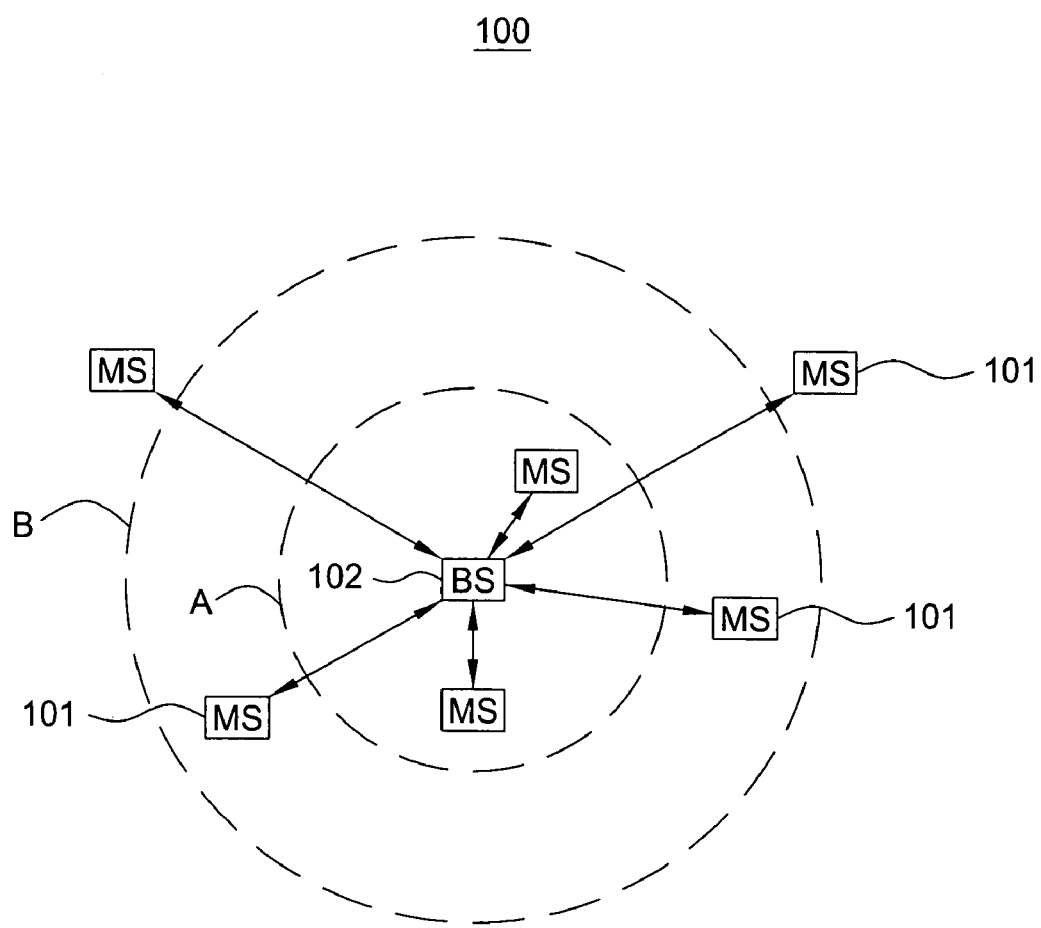
FIG. 1 shows an exemplary multi-user wireless system.

It should be noted that the appended drawings illustrate only typical embodiments of this invention and are therefore not to be construed as limiting of its scope, for the invention may admit to other equally effective embodiments. Where possible, identical reference numerals have been inserted in the figures to denote identical elements.

DETAILED DESCRIPTION

In the description that follows, certain terms are used interchangeably. The term "user" is interchanged with the terms "mobile", "mobile station", and "mobile user". The term "base station" is also used interchangeably with the term "base". These usages are not intended to be limiting in any way.

The present invention involves dynamic adaptation of the number of pulses per symbol (bit) for each UWB radio link. Since each link can be changed adapted independently from the other user links, it is possible to differentiate the adaptation for each of the links. Dynamically differentiated link adapted UWB has no restrictions on its application among different users and the adaptation can be performed independently for each user assigning the data rate desired for each case. This feature allows differentiation for quality of service for different users.

FIG. 1 shows a simplified system diagram for a typical wireless communication network 100. Wireless communication network 100 includes a number of mobile stations 101 communicating with a base station 102. The mobile stations 101 and the base station 102 include wireless transceivers that facilitate communication in the wireless network. Although not shown in FIG. 1, it is well understood that the network 100 can handle fixed or mobile users and can be interconnected with other such networks to form an even larger network. For the purposes of the present invention, it will be sufficient to deal with the simplified network in FIG. 1.

Proximity to the base station is important for the mobile stations in network 100. Several concentric zones labeled zone A and zone B are shown in FIG. 1. Zone A includes two mobile users and includes those regions closest to the base station. Zone B delineated as the area between the concentric circles includes two other mobile users located farther from the base station. Still farther from the base station are two additional mobile users outside zone B. As mobile users go farther from the base station, their communication is subject to additional attenuation, fading, noise degradation. This will be discussed in more detail below.

The present invention involves a dynamically adaptive technique for changing the number of pulses per bit, $N_s$, independently for each mobile station as channel state variations are detected. Thus, it is important at least for the sake of technical context to understand details about UWB impulse radio communications. To that end, a brief description of the modulation scheme is presented below. Basic IR modulation for UWB communications are well established in the prior art. See, for example, the Scholtz article cited above as well as U.S. Pat. No. 5,677,927 issued to Fullerton, U.S. Pat. No. 6,671,310 issued to Richards, U.S. Pat. No. 6,717,992 issued to Cowle, U.S. patent application Publication US2004/0258133, and the following technical articles: Moe Zin et al., "*Ultra-Wide Bandwidth Time-Hopping Spread Spectrum Impulse Radio for Wireless Multiple-Access Communications*," IEEE Trans. On Communications, Vol. 48, No. 4, pp. 679-691 (April 2000) and Moe Zin et al., "*Impulse Radio: How It Works*," IEEE Communications Lett., Vol. 2, No. 2, pp. 36-38 (February 1998).

UWB has been proposed as a physical layer only for wireless local area network (WLAN) and wireless personal area networks (WPAN), in which low power transmission can overcome the path loss. Those short range communication (SRC) systems are characterized for a lower average number of users compared to other medium range cellular wireless system, mainly because of limited coverage area. As will be explained in more detail below, the present invention of dynamic link adaptation for the UWB system makes it very suitable for the SRC environment because it can significantly increase the average data rate for low load systems.

Figure 2:
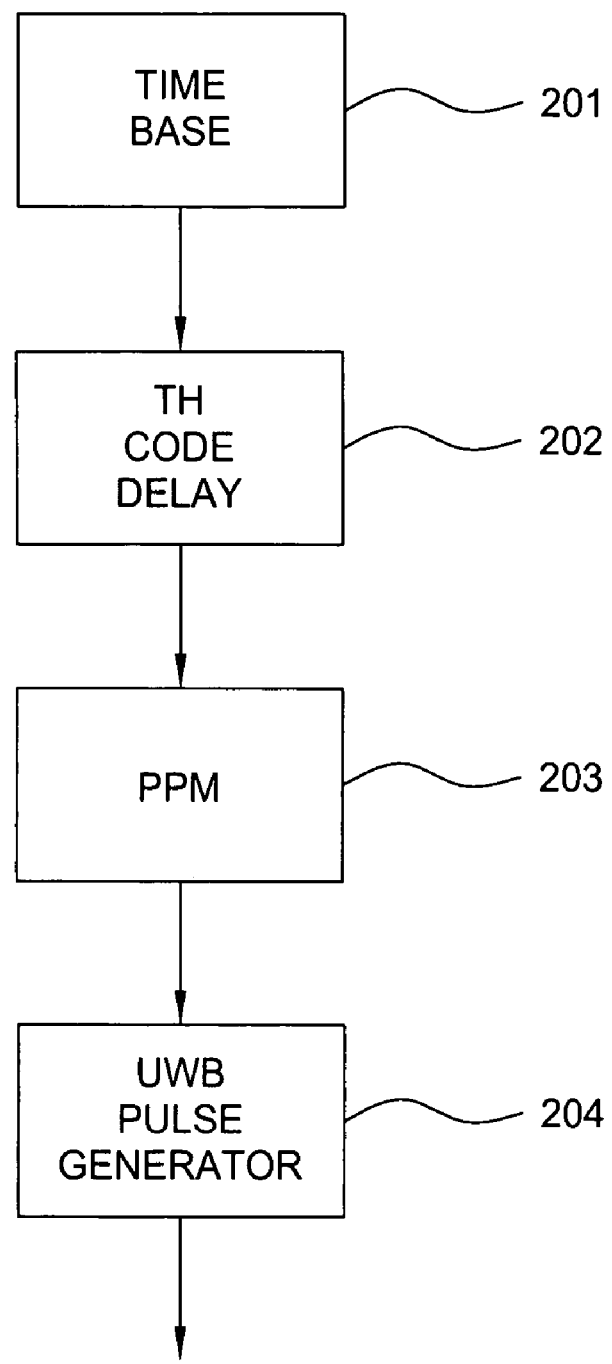
FIGS. 2 and 3 show simplified block diagram of the impulse radio modulator for use in the wireless system in accordance with the principles of the present invention.
Figure 3:
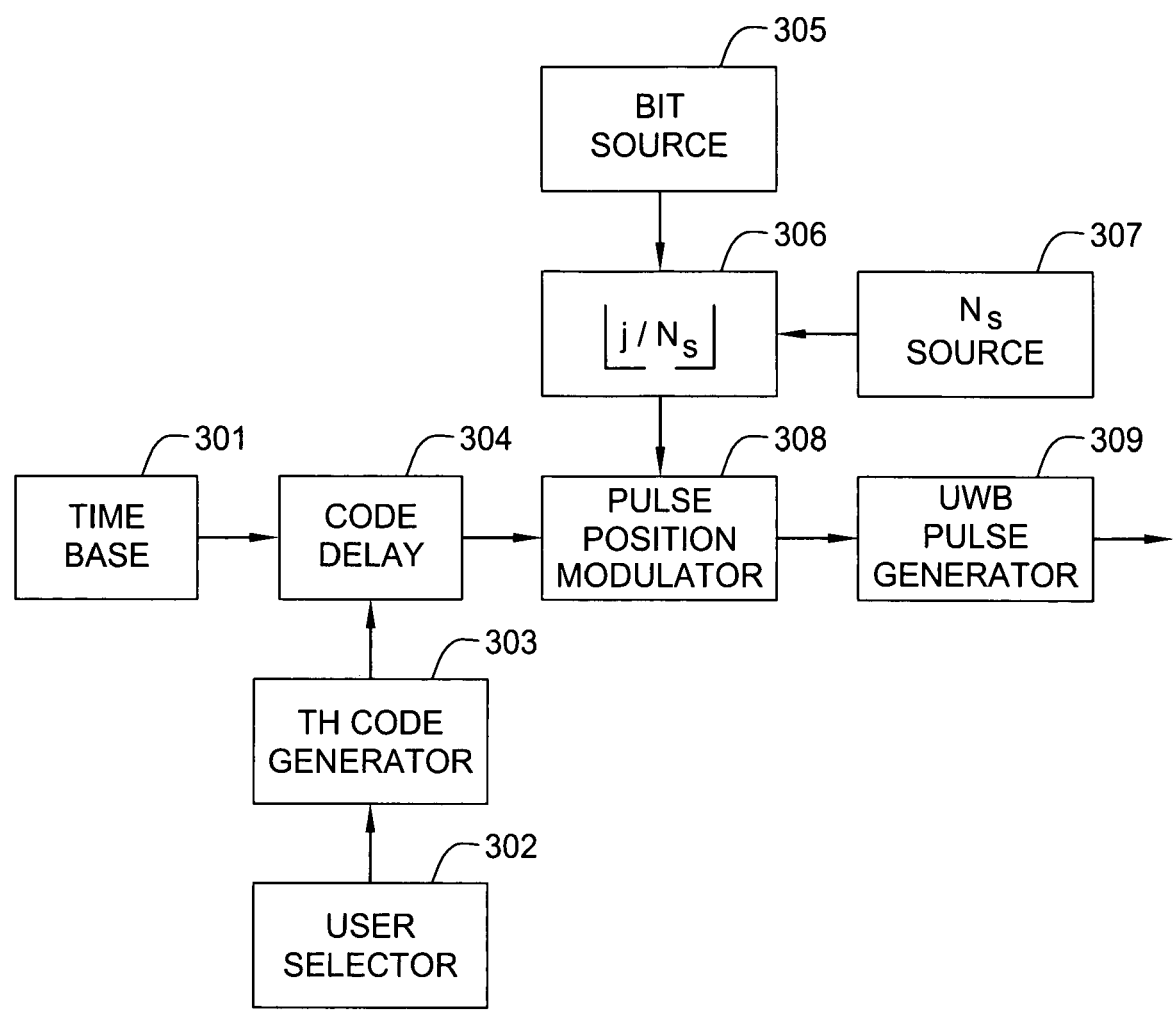

FIGS. 2 and 3 show simplified block diagrams of the impulse radio modulation technique for use in the wireless system. A typical time-hopping multiple access ultra wideband format with pulse-position data modulation (PPM) is given by, $$s^{(k)}(t) = \sum_j w_{tr}(t - jT_f - c_j^{(k)}T_c - \delta d_{\lfloor j/N_s \rfloor}^{(k)}). \quad (1)$$

where $w_{tr}(t)$ represents a transmitted pulse shape nominally beginning at time zero of the transmitter clock with pulse duration $T_p$. $T_f$ is the pulse repetition time (or frame duration). $c_j^{(k)}$ is the $j^{th}$ element of a vector containing a periodic pseudonoise (PN) sequence of length $N_p$. The time hopping code is an integer in the range [0, $N_h$] that introduces an additional time shift of $c_j^{(k)} \cdot T_c$. $d_i^{(k)}$ is the $i^{th}$ element of the binary sequence that conveys the data information of mobile station k. δ is the time shift due to information. The notation $\lfloor x \rfloor$ denotes the floor function, which returns the largest integer number less than or equal to the real number x that is the argument of the function. $N_s$ is the number of pulses per bit.

Quantities defined with superscript (k) indicate transmitter-dependent quantities. Thus, the signal emitted by the $k^{th}$ transmitter (mobile station) consists of a large number of pulse shapes shifted to different times, where the $j^{th}$ pulse shape begins at time $$jT_f + c_j^{(k)}T_c + \delta d_{\lfloor j/N_s \rfloor}^{(k)}.$$

The data rate for this signal model is given by, $$R_s = \frac{1}{T_f \cdot N_s}. \quad (2)$$

Each component of time shift is described in more detail below and shown in FIG. 2. The components of the time shifting are given as uniform pulse train spacing generated by the time base 201 (in FIG. 3, time base 301), pseudo-random time hopping generated by time-hopping code delay 202 (in FIG. 3, this is performed by user selector 302, time hopping code generator 303, and code delay 304), and data modulation including the pulse position modulation (PPM) by PPM 203 (in FIG. 3, this is performed by data bit source 305, Ns source 307, floor function element 306, and pulse position modulator 308). When the time shifting is completed, the monocycle pulse shape for the ultra-wideband system is generated by UWB pulse generator 204 (in FIG. 3, UWB pulse generator 309) to yield the transmitted pulse sequence shown in Equation (1).

Time base 201 (301) generates a uniformly spaced pulse train of the form $\Sigma_{j=-\infty}^{\infty} w(t-jT_f)$ consisting of monocycle pulses spaced $T_f$ seconds apart. This frame time or pulse repetition time $T_f$ can be much larger than the pulse width, dependent to a degree on the stability of available clock sources. This pulse train has a low duty cycle. As these signals appear in a multiple access environment with their uniformly spaced pulses, they are occasionally vulnerable to catastrophic collisions in which a large number of pulses from two or more signals are received at the same time instants. These collisions can be countered through the use of pseudo random time-hopping.

In order to eliminate catastrophic collisions in a multiple access environment as shown in FIG. 1, each mobile station or link (indexed by the integer k) is assigned a distinct pulse shift pattern $c_j^{(k)}$, which is referred to as a time hopping code. Each code element $c_j^{(k)}$ is an integer in the range $0 \leq c_j^{(k)} < N_h$. Time-hopping codes are periodic pseudorandom codes with period $N_p$, so that $$c_j^{(k)} = c_{j+iN_p}^{(k)},$$

for all integers i and j. It can thus be understood that the time-hopping code provides an additional time shift to each pulse in the pulse train, with the $j^{th}$ pulse undergoing an added shift of $c_j^{(k)} \cdot T_c$ seconds. These added time shifts caused by the code are discrete times between 0 and $N_h T_c$.

User selector 302 determines the index k for the link being used by the mobile station. Time-hopping code generator 303 generates the time-hopping code that is employed by the mobile station. Code delay 304 (or in FIG. 2, time-hopping code delay 202) uses this information to generate a pulse sequence in the following form:

$$\sum_j w(t - jT_f - c_j^{(k)}T_c). \quad (3)$$

This waveform is periodic with period $T_p = N_p T_f$ because the time-hopping code is periodic with period $N_p$. This code actually has the effect of reducing the power spectral density from the line spectral density ($1/T_f$ apart) of the uniformly spaced pulse train down to a spectral density with finer line spacing ($1/T_p$ apart).

If it is assumed that $N_h T_c \leq T_f$, then that ratio defines the fraction of the frame time over which time-hopping is allowed. In general, it is assumed that $N_h T_c / T_f$ is strictly less than one to allow time for certain transceiver operations and resettings. Catastrophic collisions can remain a possibility when $N_h T_c$ is chosen to be too small. But when $N_h T_c$ is a large enough and the time-hopping codes are well designed, multiple-access interference can be assumed to be a Gaussian random process.

Pulse position modulation based on the contents of the user data information stream provides an additional time shift for the pulse sequence as shown in Equation (1). PPM 203 performs the pulse position modulation in FIG. 2. More details are shown in FIG. 3 in which user data source 305 for the $j^{th}$ mobile station (user), $N_s$ source 307, floor function element 306, and pulse position modulator 308 combine to perform the overall pulse position modulation. The $N_s$ source 307 stores the value of the number of pulses per bit $N_s$ for the UWB IR system. Floor function element 306 performs the floor function on the ratio of the user's index, j, and the number of pulses per bit $N_s$.

The user's data sequence from bit source 305, $d_j^{(k)}$ of mobile station k is typically a binary symbol stream that conveys information in some form. This form of communication system is oversampled. That is, there are $N_s$ pulses transmitted per bit and the modulating data bit changes after every $N_s$ time hops. In this modulation technique, when the data bit is 0, no additional time shift is modulated on the pulse, but a time shift of δ is added to a pulse when the user's data bit is 1. The data modulation further smoothes the power spectral density of the pseudorandom time-hopping modulation. In this modulation format, a single bit has a duration $T_s = N_s T_f$. For a fixed frame (pulse repetition) time $T_f$, the binary symbol rate or data rate $R_s$ determines the number $N_s$ of monocycle pulses that are modulated by a given binary symbol (bit) as shown in Equation (2).

UWB pulse generator 204 and UWB pulse generator 309 translate the modulated data sequence into the pulse shapes normally associated with UWB IR monocycles. These monocycle pulses are broadcast by each mobile station to the base station.

At the base station, the received signal is a composite of the signals broadcast by the associated mobile stations as shown in FIG. 1. The model for the composite received signal at the output of the receiver's antenna, when $N_u$ users are active in the multiple-access system, is given by, $$r(t) = \sum_{k=1}^{N_u} A_k s_{rec}^{(k)}(t - \tau_k) + n(t) \quad (4)$$

where $A_k$ represents the attenuation of mobile station k's signal over the propagation path from the mobile to the base station receiver, $S_{rec}^{(k)}(t)$ is the received signal originated at user k, $\tau_k$ is a random variable that represents the potential time difference between clocks at the mobile station (transmitter) of user k and the base station (receiver), which is also called time asynchronism, and the waveform n(t) represents additive white Gaussian noise (AWGN). The number of active users $N_u$ and the signal amplitudes $A_k$ are assumed to be constant during the data symbol interval.

The antenna/propagation system modifies the shape of the transmitted monocycle $w_{tr}(t)$ to be w(t) at its output and introduces constant attenuation and delay. In the theoretical sections that follow, the channel model will be assumed to ignore multi-path and dispersive effects.

An optimum processor for extracting the desired signal is a complex structure that uses all the receiver or base station knowledge about the form of the interfering signals. However, if the number of users is large and no complete multi-user information is available, then it is reasonable to approximate the combined effect of the interfering signals from other users as a Gaussian Random Process. The basic UWB receiver, described in the IEEE MILCOM article by Scholtz cited above and incorporated herein by reference, relies on the Gaussian assumption for interference. The optimum receiver for a single bit of a binary modulated impulse signal in AWGN is a correlation receiver, which decides that $d_0^{(l)}=0$ when, $$\underbrace{\sum_{j=0}^{N_s-1} \overbrace{\int_{j=\tau_l+jT_f}^{\tau_l(j+1)T_f} r(t)v(t - jT_f - c_j^lT_c - \tau_1)dt}^{\text{pulse correlator output}=\alpha_j} > 0,}_{\text{test statistic}=\alpha} \quad (5)$$

where v(t)=w(t)−w(t−δ) is the template signal used to correlate a single pulse.

The probability of error $P_e$, when using the decision procedure of Equation (5), is given by the following equation, $$P_e = \frac{1}{2\pi} \int_{\sqrt{SNR}}^{\infty} \exp(-x^2/2)dx = Q(\sqrt{SNR}). \quad (6)$$

It has been shown in the art that, with some assumptions, the expression of the signal-to-noise ratio (SNR) to be used in Equation (6) is given by, $$SNR = \frac{A_1^2 m_p^2 N_s^2}{\sigma_{rec}^2 + N_s \sigma_a^2 \sum_{k=2}^{N_u} A_k^2}, \quad (7)$$

where $m_p$ is the correlator output when a single received pulse is correlated with the template signal and is defined with the other variables in the equations below:

$$m_p = \int_{-\infty}^{\infty} w(t)[w(t) - w(t-\delta)]dt$$

$$\sigma_a^2 = T_f^{-2} \int_{-\infty}^{\infty} [\int_{-\infty}^{\infty} w(t-s)v(t)dt]^2 ds$$

$$\sigma_{rec}^2 = E\left\{\left[\int_{t\in T_i} n(t)v_{bit}(t)dt\right]^2\right\}$$

wherein the interval $\tau_i$ contains the waveforms representing a data bit, the ideal waveform for the received bit $w_{bit}(t)$ is given by the following equation as:

$$w_{bit}(t) = \sum_{j=1}^{N_s} w(t - jT_f - c_j^{(1)}T_c - \tau_1),$$

and $v_{bit}(t)$ is the template to correlate one bit $v_{bit}(t) = w_{bit}(t) - w_{bit}(t-\delta)$. Relying on this system model, a dynamically adaptive transmission method and apparatus are described in the following section based on these system parameters. Relationships between the data rate, the probability of error and the SNR, as presented above, will be employed below to evaluate the performance of this unique adaptive transmission technique. This improved system is described in reference to FIGS. 4-6.

Adaptive Transmission offers the potential to improve the efficiency of wireless communications systems. The adaptive transmission technique described below for UWB IR wireless communications relies on the oversampling in the modulation where UWB IR receivers integrate multiple pulses to recover each bit of the transmitted information. The dynamic adaptation described below exploits the fact that an optimal number of pulses over which the UWB IR receiver integrates to recover a bit of user information is dependent on a number of variables including pulse rate, bit rate, jamming levels, and range. Performance evaluation of this adaptive scheme will be described below for systems limited by range and multi-user interference. Optimization of the adaptation strategy that maximizes the throughput for a time-varying transmission channel is also described.

Figure 4:
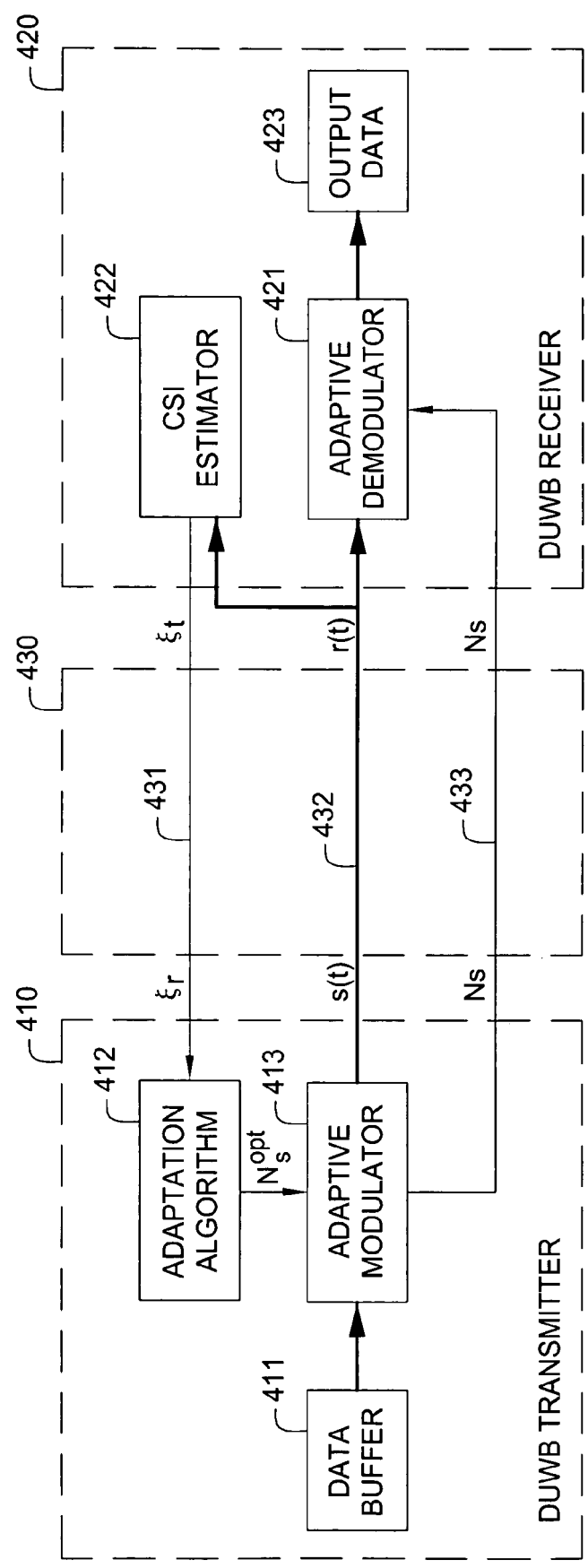
FIG. 4 shows a simplified block diagram of a transmitter and receiver communicating in the wireless system of FIG. 1 in accordance with the principles of the present invention.

FIG. 4 shows a simplified block diagram of a UWB IR transmitter and receiver communicating in the wireless system of FIG. 1 in accordance with the principles of the present invention utilizing the dynamic adaptation based on changes in the transmission channel. The system in FIG. 4 includes a dynamic UWB (DUWB) transmitter 410, a dynamic UWB (DUWB) receiver 420, and a transmission channel 430. In practice, transmitter 410 corresponds to the transmitter portion of a base station (or mobile station) in FIG. 1, whereas receiver 420 corresponds to the receiver portion of a mobile station (or base station) in FIG. 1.

The channel 430 is a wireless channel. Signals are received via antenna arrangements (not shown in the figures) at the base station and at the mobile stations. Solid lines are used across the transmission channel in FIG. 4 to show more clearly where and how the signals are used. Since each base and mobile site employs an antenna arrangement for transmission and reception and since UWB follows a signaling protocol, it will be understood by persons skilled in the art that feedback channel 431 and synchronization channel 433 are logical or virtual channels embedded in the multiple access UWB IR streams transmitted over the wireless channel.

Figure 5:
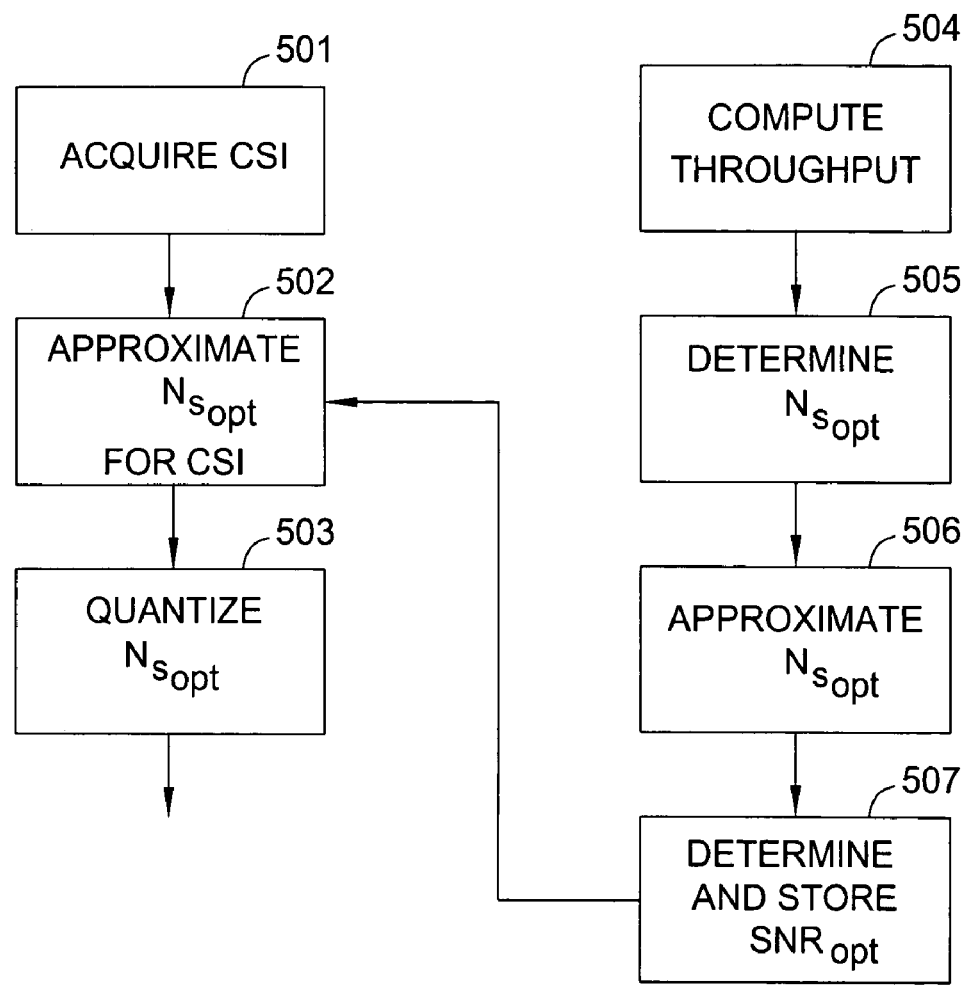
FIGS. 5 and 6 show alternate techniques for performing dynamic link adaptation in accordance with the principles of the present invention.
Figure 6:
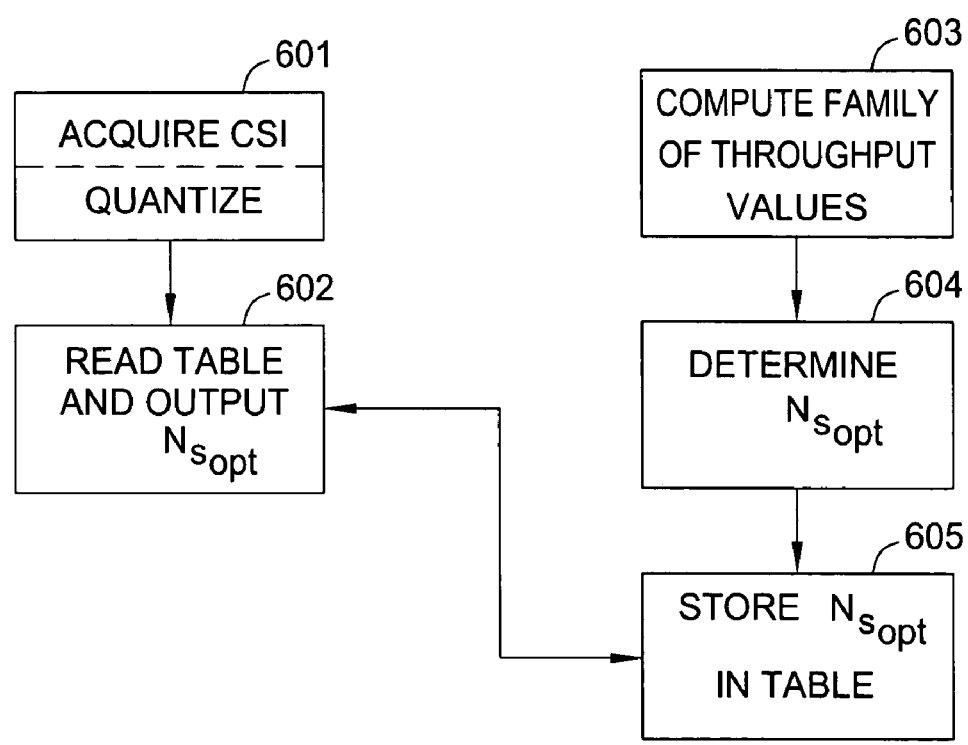

In contrast to prior multiple access UWB IR systems where the number of pulses per bit, $N_s$, is the same for all users and a fixed constant for the entire system, the present invention as shown and described in relation to FIGS. 4-6 determines optimum values for Ns for each user based upon changing channel conditions estimated by the system. While the time diversity applied to the user data combats channel variations changing as frequently as from one pulse to another and provides a statistical reduction in the BER, the multiple access UWB channels suffer from slow variations caused by external interference, shadowing, mobility, and changes in the number of users. Thus a fixed value for $N_s$ will not be optimum all the time and will therefore waste system resources such as channel capacity and throughput. The present invention makes it possible to convert this into a more optimum use of the channel achieving additional system throughput.

According to an aspect of the present invention, the transmitted signal (s(t)) is modulated using an optimal number of pulses per bit, $N_s^{opt}$, computed by the dynamic adaptation technique in FIGS. 5 and 6. The adaptation technique utilizes channel state information in order to adapt $N_s^{opt}$. Channel state information (CSI) can be estimated in the receiver as the average signal-to-noise ratio (SNR) per pulse transmitted. This information is then passed on the adaptation algorithm element to generate a new value of $N_s^{opt}$. The adaptation algorithm element can be collocated with the CSI estimator or it can be at the transmit site. In the latter case, the CSI information is transmitted over the feedback channel to the transmitter. The feedback channel is a logical channel in the regular UWB stream. When the value of $N_s^{opt}$ is updated, it is shared with the corresponding transmitter or receiver by using the synchronization channel, a logical channel embedded in the UWB stream, so that communication using the updated value of $N_s^{opt}$ can continue between the mobile and base stations without interruption.

In the present arrangement, it is contemplated that the value of $N_x^{opt}$ can be adapted and updated on a dynamic basis for each user individually and independent of the other users. By dynamically changing the value of the number of pulses per bit $N_s^{opt}$ for each user in response to variations, generally slow variations, of the channel state, it is possible to optimize each user's use of the capacity on its individual channel, thereby obtaining the maximum data rate possible while complying with any applied bit-error-rate requirement.

In the embodiment shown in FIG. 4, DUWB transmitter 410 includes data buffer 411, adaptive modulator 413 and adaptation algorithm element 412. Data buffer 411 handles the user data information to be transmitted to the receiver. Data buffer 411 supplies the user data to the adaptive modulator 413 for UWB IR modulation as described above. Adaptive modulator 413 receives the user data from buffer 411 and the updated value of the number of pulses per bit $N_s^{opt}$ for this particular user from element 412. Modulator 413 modulates the data using the value of $N_s^{opt}$ in order to generate the transmitted signal $s^{(k)}(t)$ for user k as shown in Equation (1). This signal is transmitted over wireless multiple access UWB channel 432 by a transmit antenna arrangement (not shown). Modulator 413 also sends the new value of $N_s$ for user k, $N_s^{opt}$, to the receiver via synchronization channel 433, Element 412 receives the estimated channel state information, $\hat{\xi}_r$, from the receiver via the feedback channel 431, another logical channel in the UWB stream. These logical channels can be realized in many different ways. For example, CSI information or $N_s^{opt}$ information can be assembled in an overhead or payload portion of the user data transmission.

DUWB receiver 420 includes data output buffer 423, adaptive demodulator 421 and channel state information (CSI) estimator 421. Signals received by and transmitted from receiver 420 are handled by an antenna arrangement (not shown) for UWB communication. The received UWB signal, r(t), as shown in Equation (4), is coupled to demodulator 421 and estimator 422. Adaptive demodulator 421 recovers the user data from the received signal and transfers the data to output data buffer 423. Modulator 421 also receives the updated value of $N_s^{opt}$ via the synchronization channel 433 in order to be able to adapt the demodulation routine and recover subsequent user data modulated by using the updated value of $N_s^{opt}$. Data buffer 423 is an optional element that will handle the user data to be output by the receiver. Obviously, data output can be handled directly from the output of demodulator 421. The received signal is utilized by the CSI estimator 422 to determine the channel condition. Estimation of the channel condition or state is well known in the art and will not be presented herein. Channel state estimation is expected to produce a signal that represents a signal-to-noise ration (SNR) per pulse on an average or even an instantaneous basis. The average SNR is preferred since the present invention is directed to slowly varying channel conditions. The CSI estimator 422 transmits its channel state estimation signal, $\hat{\xi}_r$, to the transmitter via feedback channel 431. As stated previously, the logical channels for feedback and synchronization can be realized in many different ways using, for example, an overhead portion or a payload portion of X symbols in the user data transmission. CSI information and updated pulse per bit information can be transmitted on a regular basis in the user data or by a special signaling format in which a trigger bit signals that one or both pieces of information are being carried in the data stream.

It is contemplated that the estimator 422 can be collocated within the same equipment as adaptation algorithm element 412. For example, if both elements were located at the base station, channel state information would be passed directly to the adaptation element to determine the new value of $N_s^{opt}$. Once determined, that new value could be transmitted to the mobile station and then the mobile station would merely notify the base over the synchronization channel when communication using the new value of $N_s^{opt}$ is about to commence.

Adaptation algorithm element 412 determines the new value of $N_s^{opt}$ in response to received channel state information, $\hat{\xi}_r$. This can be accomplished by several methods depicted in FIGS. 5 and 6. The result in each method is to output the updated optimum value of pulses per bit $N_s^{opt}$ for use by the related modulator and demodulator for user k and for the base station communicating with user k. The theory motivating these methods together with a description of the methods is described in the following section.

Earlier in this description, the relationship had been shown between the number of pulses integrated per symbol $N_s$ and the resulting probability of error $P_e$. In particular, $N_s$ was shown to affect the SNR in accordance with Equation (7), while the SNR was shown to determine the BER according to Equation (6). According to those equations, if $N_s$ is the only parameter that affects the SNR, a lower probability of error can be obtained by increasing the number of pulses per bit $N_s$. The minimum value of $N_s$ that fulfills the BER requirement is the optimum value, because it achieves the maximum data rate according to Equation (4).

The channel condition is not static, it varies with time, as does the SNR as the SNR not only depends on how many pulses per symbol $N_s$ are transmitted, but also depends on other factors such as the number of users, jamming levels and range, which are intrinsically variable in time. Therefore, a static fixed value for $N_s$ cannot be optimum because of the time variation of these other factors. Consequently, in order to maintain a specific BER for any channel condition, there is a value of $N_s$ that compensates for the variations of those other factors. Such value can be termed optimum. A value of $N_s$ lower than the so-called optimum produces an unacceptable BER, while a higher than optimum $N_s$ results in a BER potentially exceeds the required BER. Although this is not harmful per se, it might reveal that some resources are being wasted.

In order to take advantage of all resources, an adaptation in accordance with the principles of the present invention is based on the number of pulses per bit that is determined to be optimum, $N_s^{opt}$. As such, the use of that adaptation allows the modulation of the UWB IR signals to change dynamically in response to changing channel conditions.

Viewing $N_s$ or $N_s^{opt}$ as the adaptation parameter, a modulation mode can be defined for each value of $N_s$. A mode with low $N_s$ is spectrally more efficient and provides higher achievable data rates for the user because the same amount of information can be transmitted with fewer pulses according to Equation (4). Conversely, a mode with higher $N_s$ sacrifices data rate by sending more pulses per symbol in order to achieve a lower probability of error. A high $N_s$ modulation mode is more robust than a low $N_s$ mode because it requires a lower SNR to maintain the same BER. Thus, by varying $N_s$, it is possible to change the robustness to SNR and spectral efficiency of the modulation mode.

According to the principles of the present invention, a UWB system operates in a manner in which every link or channel between a user and the base station is adapted to the channel conditions by dynamically changing the number of pulses per symbol $N_s$ to an optimum value $N_s^{opt}$. In this way, throughput is increased by always using the most appropriate modulation mode for a given channel condition, that is, the modulation mode that produces best spectral efficiency for the current channel state.

Steps 501 through 507 depict one exemplary method for determining a new value for the optimum number of pulses per bit $N_s^{opt}$ in response to received estimated channel state information (CSI), $\hat{\xi}$. For the present invention, the supplied channel state information is contemplated to be a measure of the signal-to-noise ratio (SNR) per UWB pulse such as the actual SNR or average SNR. It is contemplated that steps 504-507 may be computed off-line prior to operation of the system.

In step 501, the channel state information (CSI) is acquired by well known techniques from received signals. From these signals, one is able to estimate the SNR per pulse of the UWB signals. The estimate $\hat{\xi}$ may be either an instantaneous measure or an average measure, although the latter is preferred. As mentioned above, the estimate may be determined at and received from a remote station, or it may be determined at the same station. The CSI in the form of $\xi$ is supplied to step 502.

Step 502 approximates the optimum value of $N_s$ for the given channel state information. In order to perform the approximation, step 502 receives an additional variable from step 507, namely, $SNR_{opt}$. Step 502 performs the following calculation:

$$N_s^{opt} \approx SNR_{opt}/\xi.$$

Control is then passed to optional step 503, otherwise the approximated value of $N_s^{opt}$ is output to the modulator and communicated to the remote station. Details about this approximation will be discussed immediately below.

In optional step 503, the value of $N_s^{opt}$ is quantized, if desired, to reduce the number of possible values of $N_s$ to be handled by the modulator. For example, the system may be designed to operate with values of $N_s$ that are 5, 10, 15, 20, and so on. In this case, if the value output by step 502 for $N_s$ were 17, the quantizer would output the value as either 15 or 20 based on the particular quantizer configuration as opposed to the actual value of 17. The quantizer step sizes and, in fact, the decision to utilize the quantizer step at all are matters that affect the complexity and precision of the system. It is contemplated that the most complex and precise method would most likely avoid the use of quantization in this step.

Steps 504-507 are used to determine the value of $SNR_{opt}$. Before proceeding further with this description of the method, it is important to develop an understanding of the theory and practice underlying the techniques employed in this part of the method.

In this section, a method for finding the optimum modulation mode is disclosed that maximizes the throughput, which is the amount of data that can be correctly transferred per unit of time. For a given link quality generally measured as the SNR, the throughput S achieved using $N_s$ pulses per symbol can be expressed according to the following relationship:

$$S = R_s \cdot (1 - BLER(N_s, SNR)) \quad (8)$$

where BLER is the block error rate as a function of the link quality for a given modulation scheme (specified by $N_s$), wherein a block is considered erroneous if at least one bit error occurred, and $R_s$ is the data rate defined above in Equation (4). The task of adaptive transmission can now be expressed formally as always selecting the optimum number of pulses per symbol $N_s^{opt}$ that maximizes the throughput S according to Equation (8).

BLER is the probability of at least one bit of the block being in error. That is clearly the complement of the probability of receiving all bits correctly, stated as BLER $=(1-P_c)$. Moreover, the probability of receiving all bits correctly is related to the bit error rate (BER) by $P_c=(1-BER)^L$, where L is the number of bits per block ($L=T_s/(T_f N_s)$ where $T_r$ is the block duration in units of time). By substitution into Equation 8, one derives the following equation:

$$S = \frac{1}{T_f \cdot N_s} \cdot (1 - (1 - (1 - BER)^L)), \quad (9)$$

that after some manipulation becomes, $$S = \frac{1}{T_f \cdot N_s} \cdot (1 - BER)^{\frac{T_r}{T_f N_s}}. \quad (10)$$

This expression for the throughput does not contain the SNR and therefore must be further modified.

The BER is related to the SNR per symbol in Equation (6), while the SNR per symbol is equal to the product of the SNR per pulse and the number of pulses per symbol $N_s$, as shown below:

$$SNR = N_s \xi \quad (11)$$

This fact leads inevitably to the final expression for the throughput, given as:

$$S(N_s, \xi) = \frac{1}{T_f \cdot N_s} \cdot \left(1 - Q(\sqrt{N_s \xi})\right)^{\frac{T_r}{T_f N_s}}. \quad (12)$$

Figure 10:
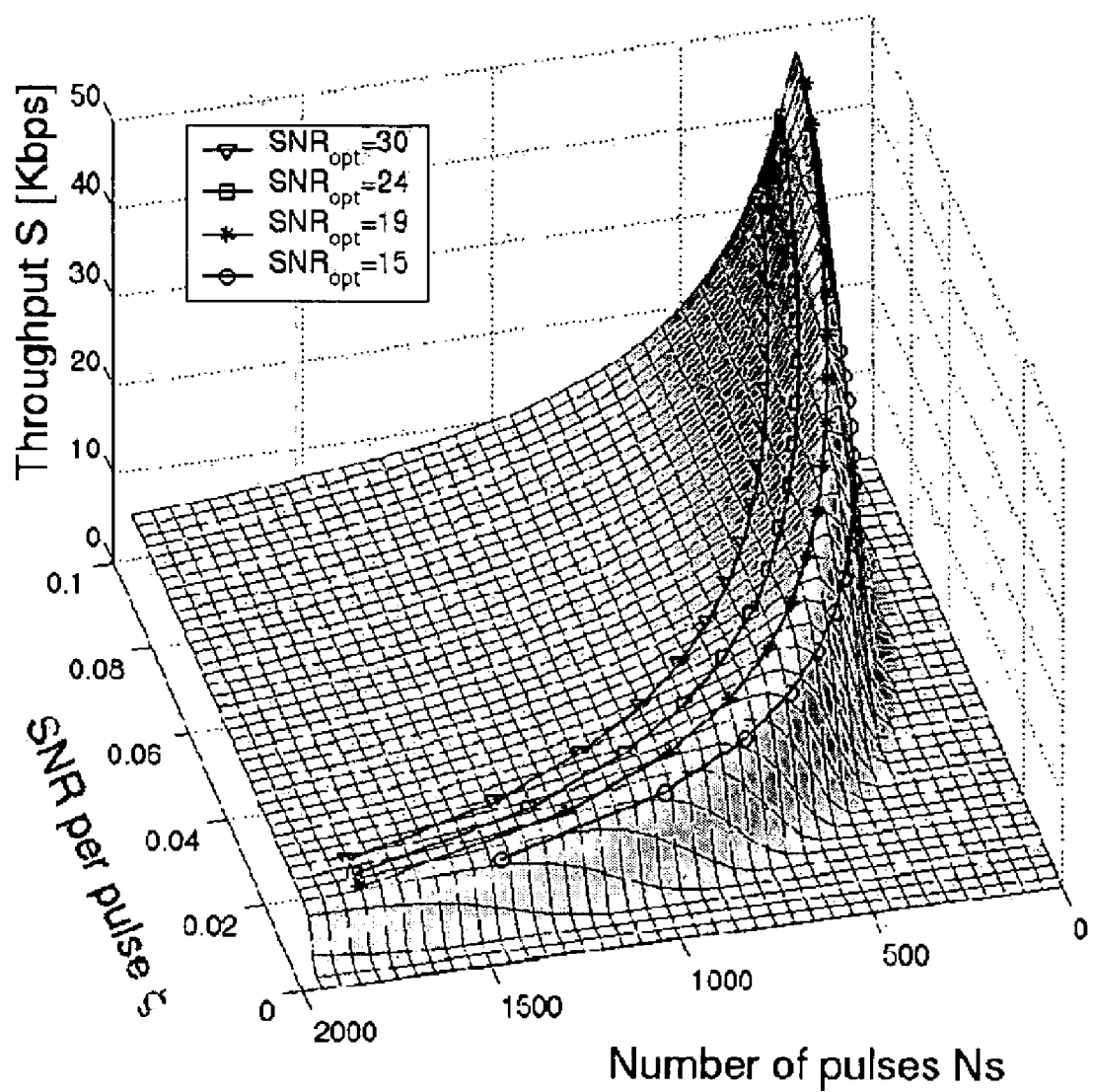
FIG. 10 shows the adaptive function curves fitting the edge of the 3-dimensional throughput surface for different values of $SNR_{opt}$.

The throughput S described in Equation (12) is a scalar function of two variables, $N_s$ and $\xi$, which is represented graphically by the surface shown in FIG. 10. By looking at FIG. 10, one can easily see the benefits of adaptive transmission in UWB communications systems in accordance with the principles of the present invention. In a standard UWB system where the value of $N_s$ is static, where the value of $N_s$ is not dynamically adapted to the SNR, the throughput attainable is limited to the values of the surface corresponding to a fixed value of $N_s$ chosen in advance. Thus, when the SNR changes in a static UWB system, it is only possible to move along the SNR axis, wherein no gain in throughput is obtainable. Higher throughput is only attainable by moving up on the surface in FIG. 10, instead of staying at the same altitude. The dynamic adaptation of DUWB enables the system to move up the throughput mountain.

The next step is to use the expression of the throughput S in Equation (12) to find optimum number of pulses per symbol to be transmitted for a given SNR per pulse, $N_s^{opt}(\xi)$, which is essential for the adaptation. The way to find $N_s^{opt}(\xi)$ analytically is to construct the following equation:

$$\frac{\partial S(N_s, \xi)}{\partial N_s} = 0. \quad (13)$$

The exact expression for $N_s^{opt}(\xi)$ derived from Equation (13), which arises from partial derivations of the Q function, is not an amenable function. For that reason, it is necessary to consider an alternative way to find a good approximation for $N_s^{opt}(\xi)$ based on the observation of the graphical representation of $S(N_s, \xi)$. Again from FIG. 10, it is understood that, for any given SNR per pulse $\xi$, the maximum throughput is achieved at the "edge" of the throughput surface. Hence, the way to obtain the maximum overall throughput is to move always along that "edge" of S. In fact, if one could know $N_s^{opt}(\xi)$ and plot the three dimensional curve $S_{opt}(N_s^{opt}(\xi), \xi)$, it would be expected that this curve would perfectly fit the "edge" of the surface S. From this argument, it is reasonable to consider that finding an expression for $N_s^{opt}(\xi)$ is equivalent to finding a curve whose three dimensional representation fits the "edge" of S. In order to find this curve, it is assumed that, as a result of the optimum adaptation by the inventive system, the BER remains constant. If this assumption is true, then according to Equation (6) it follows that the SNR per symbol also remains constant. Under such conditions, an expression for $N_s^{opt}(\xi)$ would be evident from inspection of Equation (11) as follows:

$$N_s^{opt}(\xi)=SNR_{opt}/\xi. \quad (14)$$

where $SNR_{opt}$ is an unknown constant. FIG. 10 also shows the superposition of the surface S and four $SNR_{opt}(N_s^{opt})$ curves obtained from the hypothesis for four $SNR_{opt}$ values, namely, 15, 19, 34, and 30. From its observation, it is possible to realize that the family of curves generated actually tends to fit the "edge" of S as desired. That result confirms that the assumption is valid for the stated approximation, because it is possible to find a value for $SNR_{opt}$ that makes the curve $SNR_{opt}(N_s^{opt})$ fit the edge of S. For the particular election of the parameters $T_r$ and $T_f$ used to generate the curve in FIG. 10, it is possible to judge that the best fit is obtained when $SNR_{opt}=19$. Therefore, it is reasonable to conclude that the optimal number of pulses $N_s$ to be transmitted for the particular configuration $(T_r, T_f)$ used in this exemplary system can be approximated by:

$$N_s^{opt}(\xi)=19/\xi. \quad (15)$$

In short, this approach provides a simple way to assess the key function for the adaptation $N_s^{opt}(\xi)$. The value of $SNR_{opt}$ used in Equation (15) can be different for different parameter selections of the time duration variables $T_r$ and $T_f$. None the less, $SNR_{opt}$ has to be found by following the same procedure: determining the S surface according to those parameters, superimposing the curves for different values of $SNR_{opt}$ and choosing the value of $SNR_{opt}$ that fits the surface best. By following that procedure, one can insure a good approximation to the optimum number of pulses per symbol $N_s$ to be used for any channel state.

Following the methodology set forth above, step 504 computes throughput of the system according to Equation (12) for selected set of values $T_r$ and $T_f$. Recall that $T_r$ is the time duration of a block, while $T_f$ is the time duration of a frame. $N_s$ and $\xi$ are varied over a wide range of values in this computation. A practical range for Ns in most systems is from 1 to about 500, but a higher maximum, such as 2000, is contemplated for low data rates applications as in sensor networks. A practical range for $\xi$ is from 0.001 to about 0.1, but a higher maximum range is contemplated where $\xi$ is on the order of 10 or more.

In step 505, the value of $N_s^{opt}(\xi)$ is determined by using the family of throughput values computed in step 504 according to the following function:

$$N_s^{opt}(\xi) = \arg\operatorname*{Max}_{N_s} S(N_s, \xi).$$

The "arg" function provides the particular $N_s(\xi)$ that returned the maximum throughput over all values of $N_s$.

In step 506, the optimum value of $N_s$ is approximated by using Equation (14). Then the system value to be used by the system in step 502 is determined by the following equation:

$$SNR_{opt} = \arg\operatorname*{Min}_{SNR_{opt}} \int_{\xi_{min}}^{\xi_{max}} \left(N_s^{opt}(\xi) - \frac{SNR_{opt}}{\xi}\right)^2 d\xi.$$

In the equation above, the function under the integral corresponds to a cumulative error squared. Integration occurs over the wide range of values for $\xi$, from a minimum to a maximum. The "Min" function determines the minimum for the integral function over all possible values of $SNR_{opt}$. As before, the "arg" function will return the value of $SNR_{opt}$ that results in the minimum found by the Min function. This latter value of $SNR_{opt}$ is output to and stored for later use in step 507. It is used in the calculation of $N_s^{opt}(\hat{\xi})$ in step 502.

An alternative to this method for determining $N_s^{opt}(\hat{\xi})$ is shown in FIG. 6. Steps 601 and 602 operate in real time as the channel state information (CSI) in the form of $\hat{\xi}$ is acquired and optionally quantized. Steps 603-605 are typically performed off-line (not in real time) in order to avoid delaying any update of $N_s$ to the modulator.

In step 601, the CSI is acquired and the BER per pulse $\hat{\xi}$ is estimated therefrom. As an optional step, step 601 also includes the possibility of quantizing the value of $\hat{\xi}$. Since $\hat{\xi}$ can be a real number, the quantization could involve merely a rounding operation or the return of simply the integer part of $\hat{\xi}$. Further quantization to limit the possible values of $\hat{\xi}$ without seriously affecting the accuracy of the method is also contemplated. Since there is finite storage in the look-up table from step 605, the value of $\hat{\xi}$ can be quantized to have only the same number of values that are present in the look-up table.

In step 602, the value of $\hat{\xi}$, the channel state information, is received from step 601 and utilized as the input value to perform a table look-up. The table stored in step 605 includes a range of values of $N_s^{opt}(\xi)$ and the related values of $\xi$. When the value of $N_s^{opt}(\hat{\xi})$ is retrieved by the look-up, it is output by step 602 and delivered to the adaptive modulators and demodulators.

In step 603, the family of throughput values is computed for an entire range of system values in a manner similar to that used in step 504. Following the methodology set forth above, step 603 computes throughput of the system according to Equation (12) for selected set of values for the system parameters, $T_r$ and $T_f$. Again. recall that $T_r$ is the time duration of a block, while $T_f$ is the time duration of a frame. $N_s$ and $\xi$ are varied over a wide range of values in this computation. As mentioned above, a practical range for Ns in most systems is from 1 to about 500, but a higher maximum, such as 2000, is contemplated for low data rates applications as in sensor networks. Also as mentioned above, a practical range for $\xi$ is from 0.001 to about 0.1, but a higher maximum range is contemplated where $\xi$ is on the order of 10 or more.

In step 604 similar to step 505, the value of $N_s^{opt}(\xi)$ is determined by using the family of throughput values computed in step 603 according to the following function:

$$N_s^{opt}(\xi) = \arg\operatorname*{Max}_{N_s} S(N_s, \xi).$$

The "arg" function provides the particular $N_s(\xi)$ that returned the maximum throughput over all values of $N_s$. This operation is performed for all possible values of $\xi$. Then the pair of values $(N_s^{opt}, \xi)$ is stored in the look-up table. When the value of $\hat{\xi}$ is input to the table look-up operation by step 602, the value of $N_s^{opt}(\hat{\xi})$ is output by the look-up operation.

There are a number of trade-offs between the methods shown in FIGS. 5 and 6 for determining the updated value of $N_s$ in response to channel state information. These trade-offs include speed and complexity of the computations, available storage, and accuracy and precision of the result.

The following section presents results of an evaluation of the gain for the proposed dynamic link adaptation technique added to the conventional multiple access, time-hopping UWB IR system. This evaluation shows whether or not the adaptation of Ns actually produces the expected amount of capacity increase. This evaluation also shows conditions in which a conventional UWB system may be enhanced by introducing the DUWB techniques of the present invention.

In particular, the features of DUWB have been observed and evaluated for short-range, low-power, multi-user communications. Two ideal scenarios are introduced in this section: first, a system limited by multi-user interference, and then a system limited by range are presented. The objective of this evaluation is to provide an accurate reflection of the performance of DUWB in these two conditions separately. From the results, it is possible to decide the conditions under which the employment of DUWB significantly enhances the UWB system efficiency.

In order to compare the performance of conventional UWB IR system with Dynamic UWB IR system, the average data rate per user, which is a good indicator of the system performance, is considered since it gives the expected number of bits that a user can transfer over the system per unit of time. The average data rate $\hat{R}_s$ is given by the following equation $$\hat{R}_s = E\left\{\frac{\text{Amount of Data Transferred}}{\text{Elapsed Time}}\right\}.$$

In a multi-user interference limited system, the maximum data rate is limited by interference created for other users in the same system. In the multi-user environment, a certain location is covered with UWB, for example, a room in a conference center. Users arrive and depart that location randomly and they each remain in the location for a random amount of time. While they are in the room, the UWB system provides data service to each user allowing the users to download information related to the conference such as maps, schedules, and papers. The room, in effect, behaves as an information center for the conference.

For simplicity, a Poisson traffic model is assumed for the arrivals and departures of the users. That means that the users arrive in the system with some arrival rate $\lambda$ and they remain in the system for an exponentially distributed time of mean $1/\mu$. It is also assumed that the system always provides more than a minimum data rate; for that reason, there is a limit of simultaneous active users N. The value of N is determined by the offered load and the loss probability required. This service model is equivalent to an M/M/c/c queuing system whose distribution of probabilities are:

$$p(k) = \frac{\rho^k}{k!} p_0$$

where $$p_0 = \left\{\sum_{j=0}^{N} \frac{\rho^j}{j!}\right\}^{-1},$$

and $\rho = \mu/\lambda$ is the offered load. If the Loss Probability is very low, then $\rho$ is approximately the average number of users in the system. The average data rate $\hat{R}_s$ per user in this system is given by:

$$\bar{R}_{S_m} = \sum_{N_u=1}^{N} R_{S_m}(N_u) p_m(N_u),$$

where m denotes the mode: either UWB or DUWB; $N_u$ is the number of users in the system; N is the maximum number of users supported by the system; $R_{S_m}(N_u)$ is the data rate as a function of the number of users active in the system for a mode m; and $p_m(N_u)$ is the probability of having $N_u$ users in the system for a mode m.

Figure 7:
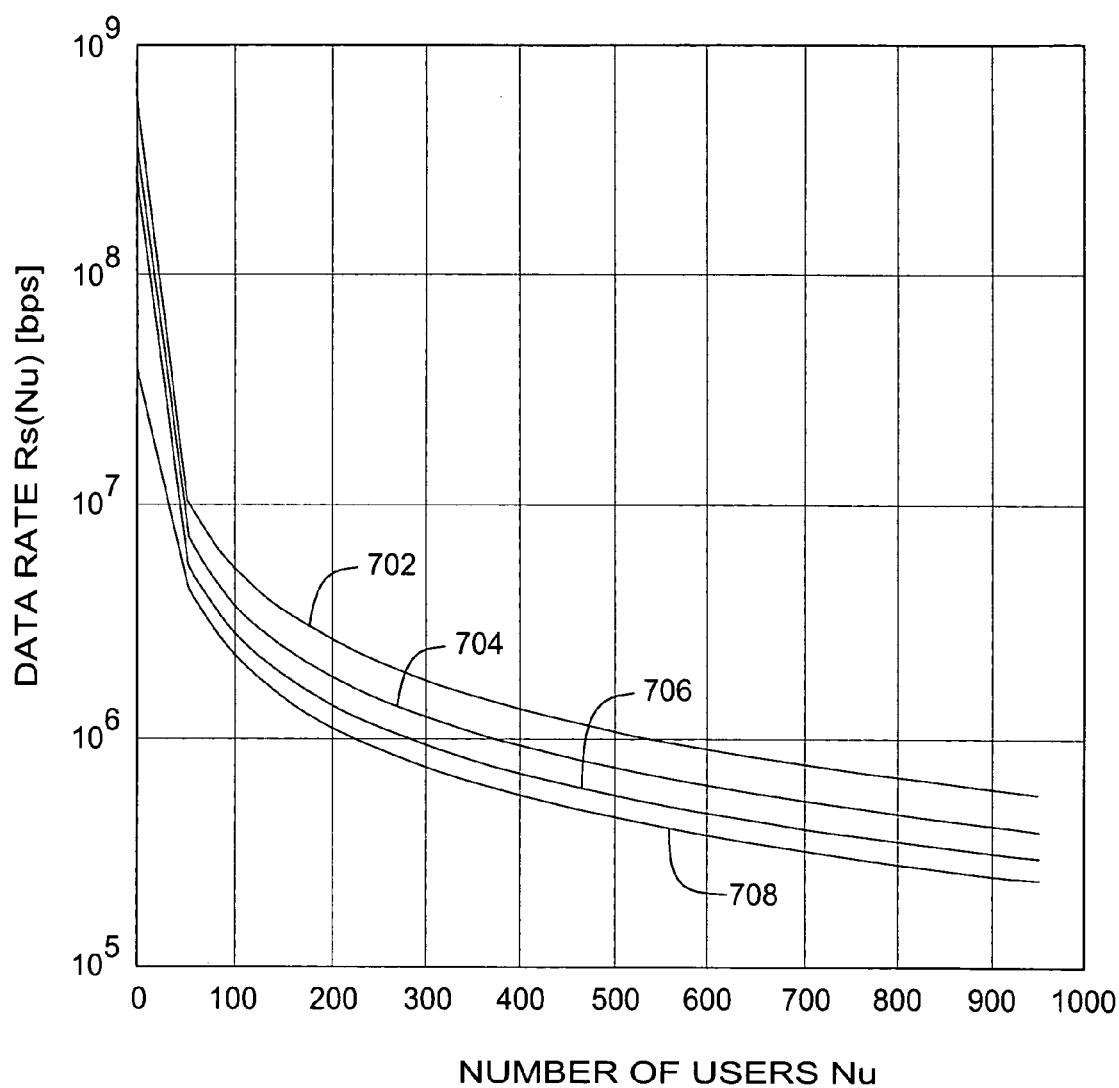
FIGS. 7-9 show a variety of performance curves for the adaptive wireless system in accordance with the principles of the present invention.

In both the UWB and the DUWB modes, $R_{S_m}(N_u)$ is strongly related to a characteristic function $\tilde{R}_s(\cdot)$ that can be derived from Equations (6) and (7). This function establishes the data rate at which Nu users can operate simultaneously so that the multi-user interference created among them produces a BER less than a specified value. This characteristic function is depicted in FIG. 7 for different BER requirements. FIG. 7 shows the data rate as a function of the number of user for bit-error-rates of $10^{-6}$ (curve 708), $10^{-5}$ (curve 706), $10^{-4}$ (curve 704), and $10^{-3}$ (curve 702).

For conventional UWB, every user operates at the same data rate. Regardless of the number of active users in the system, the system provides always the data rate that guarantees a certain BER in the worst case; that is when the number of active users is the maximum permitted. Therefore, $$R_{S_{UWB}}(N_u) = \tilde{R}_S(N).$$

In DUWB according to the present invention, it is assumed that the data rate $R_s$ is always adapted to the maximum allowed for the existing number of users while still achieving the required BER. The data rate only changes when the number of users changes. Consequently, it follows that:

$$R_{S_{DUWB}}(N_u) = \tilde{R}_S(N_u).$$

Figure 8:
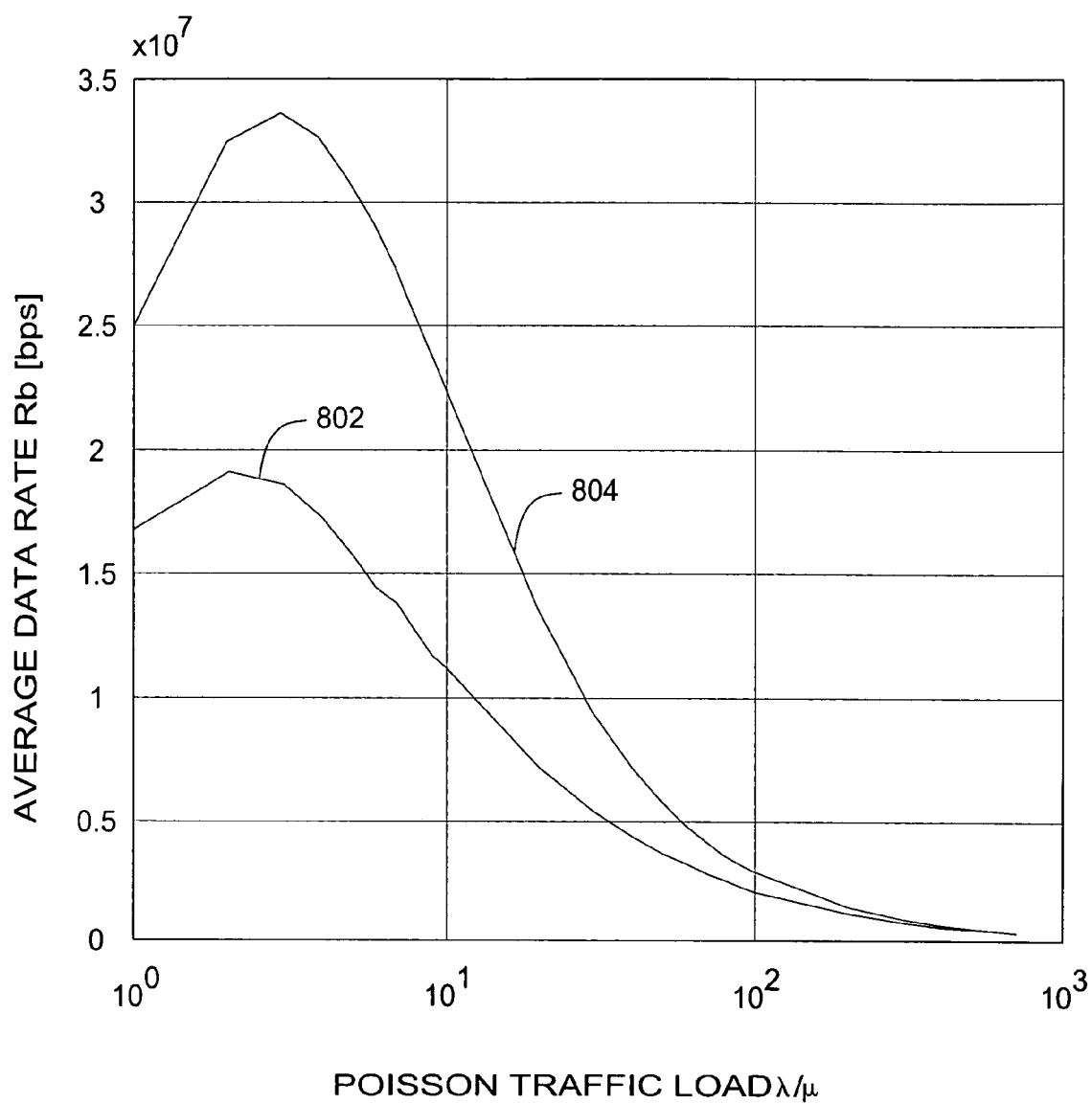

Considering that the distribution of users, $p_m(N_u)$, is the same for both modes, the average data rate per user can be calculated as a function of the traffic load for each of the conventional UWB system and the DUWB system limited for multi-user interference, as shown in FIG. 8. FIG. 8 shows the average data rate in each system for different user loads at a Poisson loading rate. The BER for each system was maintained at $10^{-5}$. Curve 802 shows the performance for the conventional UWB system, while curve 804 shows the performance for the DUWB system operating in accordance with the principles of the present invention.

It should be noted from FIG. 8 that the dynamic link adaptation in the DUWB system provides higher average data rate than the conventional UWB system regardless of the user load. For example, an average data rate of 17 Mbps is achieved with conventional UWB when the average number of users is 4. On the other hand, the dynamic link adaptation in the DUWB system provides 35 Mbps for the same traffic load. Moreover, it is important to see that the gain in average data rate per user is the highest for low loading (<10), considerable for loads between 10 and 100, and negligible for loads greater than 100. Gains up to 100% of average data rate can be attained with the dynamic link adaptation in the DUWB system when the load is low. These results affirm that the introduction of dynamic link adaptation in the DUWB system is suitable for low traffic load systems. As the system load decreases, the available gain from dynamic link adaptation in accordance with the principles of the invention increases.

This section investigates the potential of Dynamic UWB to increase the average data rate in a system limited by range. In such a system, the maximum data rate is limited by the path loss between transmitter and receiver; so that internal and external interference is not considered. As emphasized above, the conventional UWB system, a non-adaptive system design, provides the same data rate to all users. This same "selected" data rate is the maximum available in the worst case situation—in a system limited by range the worst case would be a user at the farthest location. Therefore, a user that is very near to the transmitter is not able to operate at a higher data rate, even if it could be available, because the system design demands that each user will use the same data rate provided to the farthest user in the coverage area. On the other hand, a dynamically adapted UWB system according to the principles of the present invention is capable of providing the maximum data rate available to each and every user at all locations in the coverage area. Users at different locations can employ different data rates because the data rate available is not equally distributed. It depends inversely on the range (distance from the base station to the user).

Range variation is modeled as follows. A single user is moving within the coverage area of an UWB system, which is taken as a circle with radius R such circle as is shown by exemplary circle B in FIG. 1. The user remains for some particular amount of time at each location such that the locations and amounts of time are random. This system can then be characterized by the probability distribution function (pdf) of the user being at distance d from the base station. In this system comparison, it is also important to be concerned with the influence of the cell radius R and the distribution of users within the coverage area. In order to know the influence of the former, the average data rate is computed for each of the UWB and DUWB systems as a function of cell radius R. The average data rate is computed in all cases as follows.

$$\overline{R}_{S_m} = \sum_{d=1}^{D} R_{S_m}(d) p_m(d),$$

where m denotes the mode: either a UWB system or a DUWB system; d is distance between transmitter and receiver; D is the maximum distance; $R_{S_m}(d)$ is the data rate as a function of the distance; and $p_m(d)$ is the probability of the user being at distance d.

For a circular coverage area of radius R, three different distribution of $p_m(d)$ are considered: uniform, linear with the distance, and a distribution in which $P_m(d)$ is proportional to $d^2$ (quadratic). The data rate as a function of the distance $R_{S_m}(d)$ can be obtained using a link budget equation.

Figure 9:
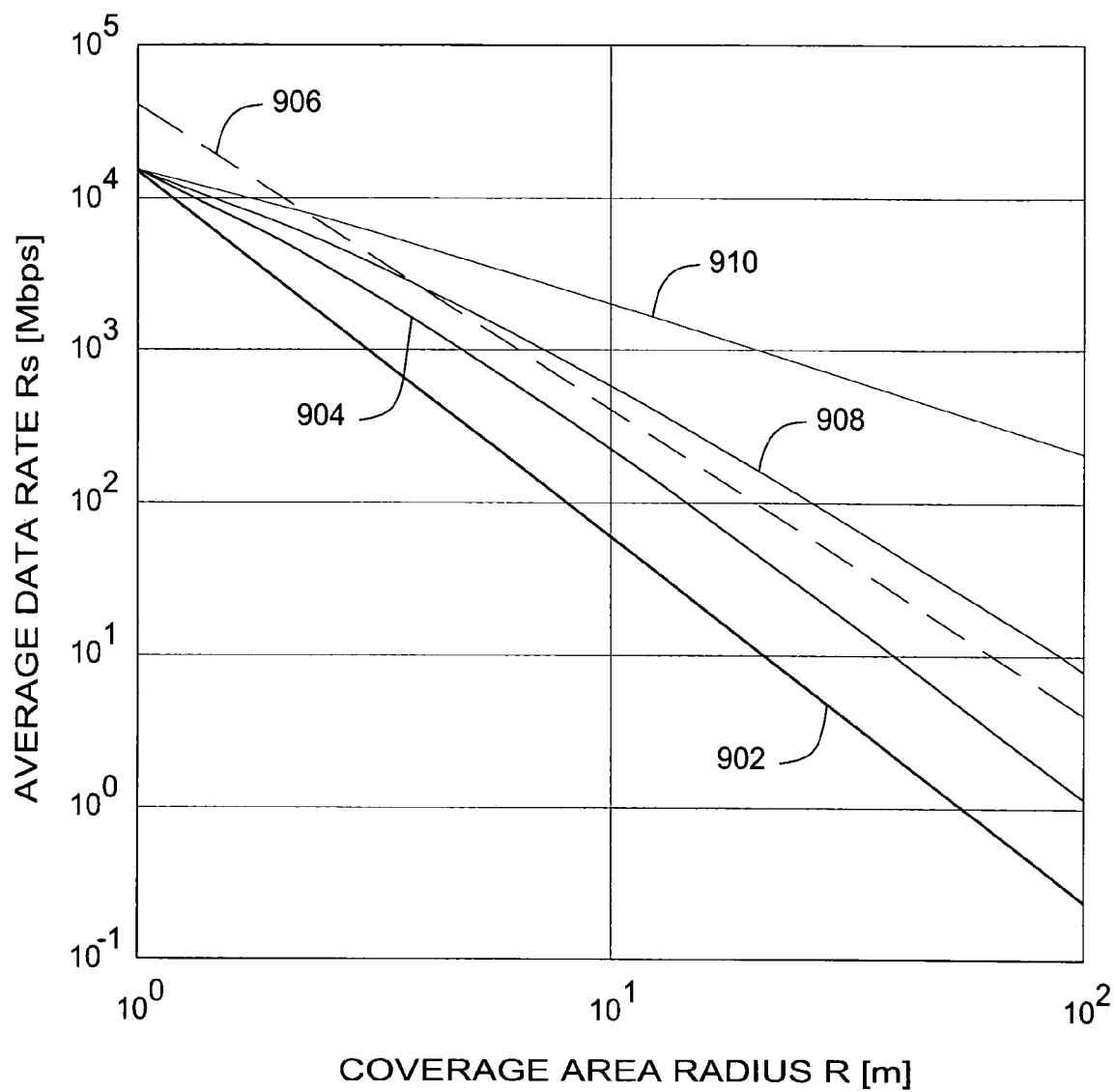

Using the equation immediately above, the average data rate $\overline{R}_{S_m}$ obtained for a single user moving randomly in a coverage area of radius R and path loss exponent, n, is illustrated in FIG. 9. FIG. 9 shows the average data rate achieved as a function of the coverage area radius for both systems. Curve 902 (n=2.4) and 906 (n=2) depict the performance of the conventional UWB system. Curve 904 (n=2.4, quadratic), curve 908 (n=2.4, linear) and curve 910 (n=2.4, uniform) depict the performance of a dynamic link adaptation for the DUWB system in accordance with the principles of the present invention.

From FIG. 9, it can be inferred that the DUWB system outperforms the conventional UWB system in terms of the average data rate per user for any coverage area radius R. For example, in a circular area of radius R=10 m, a single user can achieve an average data rate of 60 Mbps in a conventional UWB system, while the same user can attain an average data rate of 200 Mbps by using the DUWB system when its location distribution is quadratic. IN that same scenario, the user in the DUWB system can attain average data rates of 600 Mbps and 2 Gbps with linear and uniform location distributions, respectively. It should be understood that these extremely high data rates are exemplary for this analysis in which the only restriction on the data rate is the communications range, that is, the path loss. But this analysis provides useful comparisons and insights into how a system that is able to adapt its transmission parameters to the distance between transmitter and receiver, can take advantage of its limited resources to dramatically increase the average data rate provided to a user.

Also as illustrated in FIG. 9, a better average data rate per user is obtained for uniform and linear location distributions. This is due the fact that uniform distribution concentrates the position of the user to the center of the circular coverage area, where the transmitter (base station) is located. The linear distribution spreads the user positions more than the uniform distribution, hence it provides the lower average data rate per user. The quadratic distribution, which can be interpreted as a linear distribution in area rather than distance, is the most common user distribution model in a cellular system. FIG. 9 also shows the average data rate per user obtained for a conventional UWB system with path loss exponent n=2, to provide a reference for the level of improvement achieved by dynamic link adaptation in the DUWB system of the present invention. From this analysis, one can conclude that for a linear distribution of positions, the average data rate per user in a DUWB system with path loss exponent n=2.4 is better than the average data rate per user obtained with a conventional UWB system if the path loss exponent was n=2.

In this section, the advantages of the DUWB system have been analyzed in two ideal scenarios, one limited by multi-user interference and another limited by range. In each scenario, the DUWB system significantly outperforms a non-adaptive conventional UWB system. By utilizing accurate channel state estimation and an individually optimized value of Ns for each user based on the channel state information, the DUWB system is expected to outperform the conventional UWB system in real operating environments by trading SNR with data rate per user. When the channel quality is diminished, the DUWB system users can decrease their data rate in order to achieve the desired BER; and when the channel quality is good, the users can reutilize their excess in BER to increase their data rate.

Dynamic adaptation of UWB radio link using the number of pulses per symbol has relatively low complexity. The number of modes provided for adaptation is so large that a precise adaptation, perfectly matched to the channel prediction, is ensured. DUWB has no restrictions on its application among different users and the adaptation can be performed independently for each user assigning the data rate desired for each case. This feature allows differentiation for quality of service for different users.

While the foregoing is directed to embodiments of the present invention, other and further embodiments of the invention may be devised without departing from the basic scope thereof, and the scope thereof is determined by the claims that follow.

What is claimed is:

1. Apparatus for an ultra wide bandwidth (UWB) impulse radio (IR) communications system wherein user information bits are modulated to include, in part, a plurality of pulses $N_s$ for each information bit, the apparatus comprising:
   means responsive to a communication signal on a particular user link associated with a desired user for determining channel state information therefrom;
   means responsive to said channel state information for adaptively varying a modulation parameter so that data throughput on said user link is substantially optimized, the modulation parameter being a measure of the number of pulses per user information bit, $N_s^{opt}$,
   wherein the means for adaptively varying further includes means for calculating $N_s^{opt}$ as:

$$N_s^{opt} \approx SNR_{opt}/\hat{\xi},$$

where $\hat{\xi}$ is the determined channel state information and $SNR_{opt}$ is a constant value determined as follows:

$$SNR_{opt} = \arg \min_{SNR_{opt}} \int_{\xi_{min}}^{\xi_{max}} \left( N_s^{opt}(\xi) - \frac{SNR_{opt}}{\xi} \right)^2 d\xi.$$

2. The apparatus according to claim 1, wherein said channel state information is to be received via a feedback channel.

3. The apparatus as defined in claim 1, further comprising means for transmitting said modulation parameter $N_s^{opt}$ to a remote location.

4. The apparatus as defined in claim 3, further comprising means responsive to at least the modulation parameter $N_s^{opt}$ supplied by the adaptively varying means for modulating the user information bits in accordance with the adaptively varied modulation parameter, $N_s^{opt}$.

5. The apparatus as defined in claim 1, wherein the channel state information is selected from the group consisting of an average signal-to-noise ratio per pulse and an instantaneous signal-to-noise ratio per pulse.

6. The apparatus as defined in claim 1, further comprising means for quantizing the number of pulses per bit $N_s^{opt}$ to one of a particular set of values in a desired range.

7. Apparatus for an ultra wide bandwidth (UWB) impulse radio (IR) communications system wherein user information bits are modulated to include, in part, a plurality of pulses $N_s$ for each information bit, the apparatus comprising:
   means responsive to a communication signal on a particular user link associated with a desired user for determining channel state information therefrom;
   means responsive to said channel state information for adaptively varying a modulation parameter so that data throughput on said user link is substantially optimized, the modulation parameter being a measure of the number of pulses per user information bit $N_s^{opt}$,
   wherein the means for adaptively varying further includes means for computing $N_s^{opt}$ in response to a value of the channel state information $\hat{\xi}$ as follows:

$$N_s^{opt}(\xi) = \arg \max_{N_s} S(N_s, \xi).$$

where $S(N_s, \hat{\xi})$ is a throughput function defined as:

$$S(N_s, \xi) = \frac{1}{T_f \cdot N_s} \cdot \left(1 - Q(\sqrt{N_s \xi})\right)^{\frac{T_r}{T_f N_s}}$$

for $T_r$ and $T_f$ as UWB IR system parameters, where $T_r$ is time duration of a data block and $T_f$ is time duration of a data frame.

8. The apparatus as defined in claim 7, further comprising means for quantizing the channel state information to one of a particular set of values in a desired range.

9. Apparatus for an ultra wide bandwidth (UWB) impulse radio (IR) communications system wherein user information bits are modulated to include, in part, a plurality of pulses $N_s$ for each information bit, the apparatus comprising:
   means for receiving channel state information from a remote location related to a particular link associated with a desired user;
   means responsive to said channel state information for adaptively varying a modulation parameter so that data throughput on said user link is substantially optimized, the modulation parameter being a measure of the number of pulses per user information bit $N_s^{opt}$,
   wherein the means for adaptively varying further includes means for calculating $N_s^{opt}$ as:

$$N_s^{opt} \approx SNR_{opt}/\hat{\xi},$$

where $\hat{\xi}$ is the determined channel state information and $SNR_{opt}$ is a constant value determined as follows:

$$SNR_{opt} = \arg \min_{SNR_{opt}} \int_{\xi_{min}}^{\xi_{max}} \left( N_s^{opt}(\xi) - \frac{SNR_{opt}}{\xi} \right)^2 d\xi.$$

10. The apparatus according to claim 9, wherein said channel state information is to be received via a feedback channel.

11. The apparatus as defined in claim 9, further comprising means for transmitting said modulation parameter $N_s^{opt}$ to a remote location.

12. The apparatus as defined in claim 11, further comprising means responsive to at least the modulation parameter $N_s^{opt}$ supplied by the adaptively varying means for modulating the user information bits in accordance with the adaptively varied modulation parameter, $N_s^{opt}$.

13. The apparatus as defined in claim 9, wherein the channel state information is selected from the group consisting of an average signal-to-noise ratio per pulse and an instantaneous signal-to-noise ratio per pulse.

14. The apparatus as defined in claim 9, further comprising means for quantizing the number of pulses per bit $N_s^{opt}$ to one of a particular set of values in a desired range.

15. Apparatus for an ultra wide bandwidth (UWB) impulse radio (IR) communications system wherein user information bits are modulated to include, in part, a plurality of pulses $N_s$ for each information bit, the apparatus comprising:
   means for receiving channel state information from a remote location related to a particular link associated with a desired user;
   means responsive to said channel state information for adaptively varying a modulation parameter so that data throughput on said user link is substantially optimized, the modulation parameter being a measure of the number of pulses per user information bit $N_s^{opt}$, wherein the means for adaptively varying further includes means for computing $N_s^{opt}$ in response to a value of the channel state information $\hat{\xi}$ as follows:

$$N_s^{opt}(\hat{\xi}) = \arg\max_{N_s} S(N_s, \hat{\xi})$$

where $S(N_s, \hat{\xi})$ is a throughput function defined as:

$$S(N_s, \hat{\xi}) = \frac{1}{T_f \cdot N_s} \cdot \left(1 - Q\left(\sqrt{N_s \hat{\xi}}\right)\right)^{\frac{T_r}{T_f N_s}}$$

for $T_r$ and $T_f$ as UWB IR system parameters, where $T_r$ is time duration of a data block and $T_f$ is time duration of a data frame.

16. The apparatus as defined in claim 15, further comprising means for quantizing the channel state information to one of a particular set of values in a desired range.

17. A method for dynamically differentiated link adaptation in an ultra wide bandwidth communication system wherein user information bits are modulated to include, in part, a plurality of pulses $N_s$ for each information bit, the method comprising:

acquiring channel state information related to a particular communication link in the system;

adaptively varying, in response to said channel state information, a modulation parameter so that data throughput on said user link is substantially optimized, the modulation parameter being a measure of the number of pulses per user information bit, $N_s^{opt}$, wherein the step of adaptively varying step further includes the step of calculating $N_s^{opt}$ as:

$$N_s^{opt} \approx SNR_{opt}/\hat{\xi},$$

where $\hat{\xi}$ is the determined channel state information and $SNR_{opt}$ is a constant value determined as follows:

$$SNR_{opt} = \arg\min_{SNR_{opt}} \int_{\xi_{min}}^{\xi_{max}} \left(N_s^{opt}(\xi) - \frac{SNR_{opt}}{\xi}\right)^2 d\xi.$$

18. The method according to claim 17, further comprising obtaining said channel state information via a feedback channel.

19. The method as defined in claim 17, further comprising transmitting said modulation parameter $N_s^{opt}$ to a remote location.

20. The method as defined in claim 19, further comprising modulating, in response to at least the modulation parameter $N_s^{opt}$ in the adaptively varying step, the user information bits in accordance with the adaptively varied modulation parameter, $N_s^{opt}$.

21. The method as defined in claim 17, wherein the channel state information is selected from the group consisting of an average signal-to-noise ratio per pulse and an instantaneous signal-to-noise ratio per pulse.

22. The method as defined in claim 17, further comprising quantizing the number of pulses per bit $N_s^{opt}$ to one of a particular set of values in a desired range.

23. A method for dynamically differentiated link adaptation in an ultra wide bandwidth communication system wherein user information bits are modulated to include, in part, a plurality of pulses $N_s$ for each information bit, the method comprising:

acquiring channel state information related to a particular communication link in the system;

adaptively varying, in response to said channel state information, a modulation parameter so that data throughput on said user link is substantially optimized, the modulation parameter being a measure of the number of pulses per user information bit, $N_s^{opt}$, wherein the step of adaptively varying step further includes the step of computing $N_s^{opt}$ in response to a value of the channel state information $\hat{\xi}$ as follows:

$$N_s^{opt}(\hat{\xi}) = \arg\max_{N_s} S(N_s, \hat{\xi})$$

where $S(N_s, \hat{\xi})$ is a throughput function defined as:

$$S(N_s, \hat{\xi}) = \frac{1}{T_f \cdot N_s} \cdot \left(1 - Q\left(\sqrt{N_s \hat{\xi}}\right)\right)^{\frac{T_r}{T_f N_s}}$$

for $T_r$ and $T_f$ as UWB IR system parameters, where $T_r$ is time duration of a data block and $T_f$ is time duration of a data frame.

24. The method as defined in claim 23, further comprising quantizing the channel state information to one of a particular set of values in a desired range.

25. Method for dynamically differentiated link adaptation in an ultra wide bandwidth (UWB) impulse radio (IR) communications system wherein user information bits are modulated to include, in part, a plurality of pulses $N_s$ for each information bit, the method comprising:

receiving channel state information from a remote location related to a particular link associated with a desired user;

adaptively varying, in response to said channel state information, a modulation parameter so that data throughput on said user link is substantially optimized, the modulation parameter being a measure of the number of pulses per user information bit, $N_s^{opt}$, wherein said adaptively varying further includes calculating $N_s^{opt}$ as:

$$N_s^{opt} \approx SNR_{opt}/\hat{\xi}$$

where $\hat{\xi}$ is the determined channel state information and $SNR_{opt}$ is a constant value determined as follows:

$$SNR_{opt} = \arg\min_{SNR_{opt}} \int_{\xi_{min}}^{\xi_{max}} \left(N_s^{opt}(\xi) - \frac{SNR_{opt}}{\xi}\right)^2 d\xi.$$

26. The method according to claim 25, further comprising obtaining said channel state information via a feedback channel.

27. The method as defined in claim 25, further comprising transmitting said modulation parameter $N_s^{opt}$ to a remote location.

28. The method as defined in claim 27, further comprising modulating, in response to at least the modulation parameter $N_s^{opt}$ in the adaptively varying step, the user information bits in accordance with the adaptively varied modulation parameter, $N_s^{opt}$.

29. The method as defined in claim 25, wherein the channel state information is selected from the group consisting of an average signal-to-noise ratio per pulse and an instantaneous signal-to-noise ratio per pulse.

30. The method as defined in claim 25, further comprising quantizing the number of pulses per bit $N_s^{opt}$ to one of a particular set of values in a desired range.

31. Method for dynamically differentiated link adaptation in an ultra wide bandwidth (UWB) impulse radio (IR) communications system wherein user information bits are modulated to include, in part, a plurality of pulses $N_s$ for each information bit, the method comprising:
  receiving channel state information from a remote location related to a particular link associated with a desired user;
  adaptively varying, in response to said channel state information, a modulation parameter so that data throughput on said user link is substantially optimized, the modulation parameter being a measure of the number of pulses per user information bit, $n_s^{opt}$,
  wherein said adaptively varying further includes computing $N_s^{opt}$ in response to a value of the channel state information $\xi$ as follows:

$$N_s^{opt}(\xi) = \arg\max_{N_s} S(N_s, \xi)$$

where $S(N_s, \xi)$ is a throughput function defined as:

$$S(N_s, \xi) = \frac{1}{T_f \cdot N_s} \cdot \left(1 - Q(\sqrt{N_s \xi})\right)^{\frac{T_r}{T_f N_s}}$$

for $T_r$ and $T_f$ as UWB IR system parameters, where $T_r$ is time duration of a data block and $T_f$ is time duration of a data frame.

32. The method as defined in claim 31, further comprising quantizing the channel state information to one of a particular set of values in a desired range.

33. The apparatus according to claim 7, wherein said channel state information is to be received via a feedback channel.

34. The apparatus as defined in claim 7, further comprising means for transmitting said modulation parameter $N_s^{opt}$ to a remote location.

35. The apparatus as defined in claim 34, further comprising means responsive to at least the modulation parameter $N_s^{opt}$ supplied by the adaptively varying means for modulating the user information bits in accordance with the adaptively varied modulation parameter, $N_s^{opt}$.

36. The apparatus as defined in claim 7, further comprising means for quantizing the number of pulses per bit $N_s^{opt}$ to one of a particular set of values in a desired range.

37. The apparatus as defined in claim 1, further comprising means for quantizing the channel state information to one of a particular set of values in a desired range.

38. The apparatus according to claim 15, wherein said channel state information is to be received via a feedback channel.

39. The apparatus as defined in claim 15, further comprising means for transmitting said modulation parameter $N_s^{opt}$ to a remote location.

40. The apparatus as defined in claim 39, further comprising means responsive to at least the modulation parameter $N_s^{opt}$ supplied by the adaptively varying means for modulating the user information bits in accordance with the adaptively varied modulation parameter, $N_s^{opt}$.

41. The apparatus as defined in claim 15, further comprising means for quantizing the number of pulses per bit $N_s^{opt}$ to one of a particular set of values in a desired range.

42. The apparatus as defined in claim 9, further comprising means for quantizing the channel state information to one of a particular set of values in a desired range.

43. The method according to claim 23, further comprising obtaining said channel state information via a feedback channel.

44. The method as defined in claim 23, further comprising transmitting said modulation parameter $N_s^{opt}$ to a remote location.

45. The method as defined in claim 44, further comprising modulating, in response to at least the modulation parameter $N_s^{opt}$ in the adaptively varying step, the user information bits in accordance with the adaptively varied modulation parameter, $N_s^{opt}$.

46. The method as defined in claim 23, quantizing the number of pulses per bit $N_s^{opt}$ to one of a particular set of values in a desired range.

47. The method as defined in claim 17, further comprising quantizing the channel state information to one of a particular set of values in a desired range.

48. The method according to claim 31, further comprising obtaining said channel state information via a feedback channel.

49. The method as defined in claim 31, further comprising transmitting said modulation parameter $N_s^{opt}$ to a remote location.

50. The method as defined in claim 49, further comprising modulating, in response to at least the modulation parameter $N_s^{opt}$ in the adaptively varying step, the user information bits in accordance with the adaptively varied modulation parameter, $N_s^{opt}$.

51. The method as defined in claim 31, quantizing the number of pulses per bit $N_s^{opt}$ to one of a particular set of values in a desired range.

52. The method as defined in claim 25, further comprising quantizing the channel state information to one of a particular set of values in a desired range.

* * * * *

UNITED STATES PATENT AND TRADEMARK OFFICE
CERTIFICATE OF CORRECTION

| | |
|---|---|
| PATENT NO. | : 7,386,045 B2 |
| APPLICATION NO. | : 11/075254 |
| DATED | : June 10, 2008 |
| INVENTOR(S) | : Yeheskel Bar-Ness et al. |

It is certified that error appears in the above-identified patent and that said Letters Patent is hereby corrected as shown below:

Col. 22 Line 4-33
Claim 23 should read as follows:

23. A method for dynamically differentiated link adaptation in an ultra wide bandwidth communication system wherein user information bits are modulated to include, in part, a plurality of pulses $N_s$ for each information bit, the method comprising:

acquiring channel state information related to a particular communication link in the system;

adaptively varying, in response to said channel state information, a modulation parameter so that data throughput on said user link is substantially optimized, the modulation parameter being a measure of the number of pulses per user information bit, $N_s^{opt}$, wherein said adaptively varying further includes the step of computing $N_s^{opt}$ in response to a value of the channel state information $\xi$ as follows:

$$N_s^{opt}(\xi) = \arg\max_{N_s} S(N_s, \xi),$$

UNITED STATES PATENT AND TRADEMARK OFFICE
CERTIFICATE OF CORRECTION

PATENT NO. : 7,386,045 B2
APPLICATION NO. : 11/075254
DATED : June 10, 2008
INVENTOR(S) : Yeheskel Bar-Ness et al.

It is certified that error appears in the above-identified patent and that said Letters Patent is hereby corrected as shown below:

where $S(N_s, \xi)$ is a throughput function defined as:

$$S(N_s, \xi) = \frac{1}{T_f \cdot N_s} \cdot \left(1 - Q(\sqrt{N_s}\xi)\right)^{\frac{T_r}{T_f N_s}}$$

for $T_r$ and $T_f$ as UWB IR system parameters, where $T_r$ is time duration of a data block and $T_f$ is time duration of a data frame.

Signed and Sealed this

Ninth Day of September, 2008

JON W. DUDAS
*Director of the United States Patent and Trademark Office*